United States Patent [19]

Gauch

[11] 4,058,012

[45] Nov. 15, 1977

[54] APPARATUS FOR MEASURING THE FLOW OF FINE-GRAINED HOT SOLIDS

[75] Inventor: Georg Gauch, Gotzenhain, Germany

[73] Assignee: Metallgesellschaft Aktiengesellschaft, Frankfurt am Main, Germany

[21] Appl. No.: 737,372

[22] Filed: Nov. 1, 1976

[30] Foreign Application Priority Data

Dec. 4, 1975 Germany .............................. 2554534

[51] Int. Cl.² .............................................. G01F 1/28
[52] U.S. Cl. .......................................... 73/228; 222/55
[58] Field of Search ............................. 73/228; 222/55

[56] References Cited

U.S. PATENT DOCUMENTS

| 2,047,203 | 7/1936 | Henson | 222/55 X |
| 3,351,236 | 11/1967 | Sorenson et al. | 222/55 X |
| 3,412,699 | 11/1968 | Culp et al. | 222/55 X |
| 3,611,803 | 10/1971 | Kajiura et al. | 73/228 |
| 3,756,434 | 9/1973 | Teske | 222/55 X |

FOREIGN PATENT DOCUMENTS

| 2,346,967 | 4/1975 | Germany | 73/228 |
| 2,412,258 | 9/1975 | Germany | 73/228 |

*Primary Examiner*—Herbert Goldstein
*Attorney, Agent, or Firm*—Burgess, Dinklage & Sprung

[57] ABSTRACT

Apparatus for measuring the flow rate of particulate solids such as coal or coke at temperatures of up to about 1000° C. The solids impinge from a predetermined height onto a sensing plate and the impulses imparted thereto are fed to a measuring system. A gastight housing is provided with an inlet for the solids and an intermediate chamber communicates with the inlet and contains a substantially horizontal conveyor for moving the solids to a passage which leads downwardly to a downcomer well disposed below the passage. The downcomer well contains the sensing plate against which the solids impinge.

5 Claims, 1 Drawing Figure

U.S. Patent    Nov. 15, 1977    4,058,012
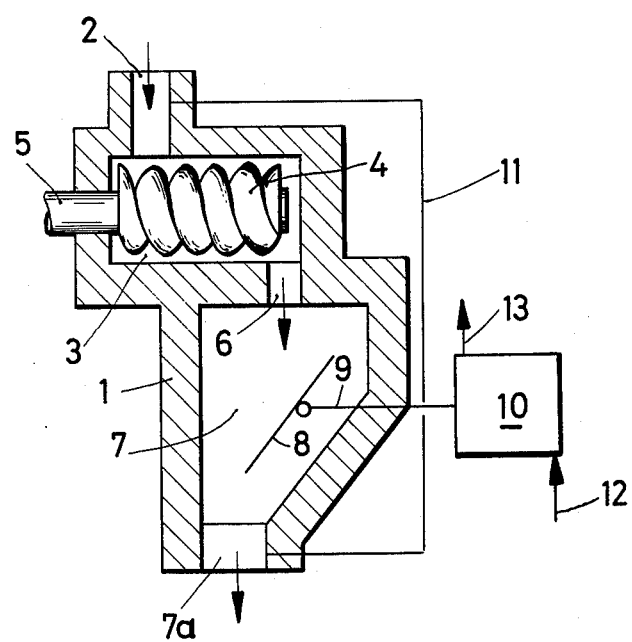

APPARATUS FOR MEASURING THE FLOW OF FINE-GRAINED HOT SOLIDS

BACKGROUND

This invention relates to apparatus for measuring the flow rate of fine-grained solids, particularly coal or coke, which are at temperatures up to about 1000° C and impinge from a predetermined height on a sensing plate and impart impulses thereto, which are fed to a measuring system.

In a known system for measuring the flow rate of powdery or granular solids, the solids impinge in a continuous or discontinuous stream on a sensing plate and the impulses imparted to the sensing plate are measured. If the particles impinge on the sensing plate at a constant velocity, the flow rate can be calculated from the magnitude and frequency of the impulses. Such a measuring system is known from Opened German Specification No. 2,115,773 and U.S. Pat. Nos. 3,640,135 and 3,742,762 and is commercially available under the name "Sankyo Impact Line System".

SUMMARY

This invention improves the known measuring system for use with hot solids in the temperature range up to about 1000° C and excludes the ambient air from the solids during the flow rate measurement. This is accomplished by providing a gastight housing with an inlet for the solids, an intermediate chamber adjacent (below) the inlet containing a substantially horizontally acting conveyor for conveying the solids to a passage, and a downcomer well disposed below the passage and contains the sensing plate.

The design according to the invention shields the fine-grained hot solids, preferably coal or coke, from the environment during the flow rate measurement in such a manner that an access of oxygen is avoided and inflammation is prevented. The conveyor provided in the intermediate chamber ensures that the incoming solids are retarded to zero velocity of fall and impinge on the sensing plate from a constant height of fall. As a result, the apparatus meets the requirements for an optimum accuracy of measurement.

The conveyor in the intermediate chamber may be designed in various ways and may suitably consist, e.g., of a chain conveyor or, above all, a screw conveyor.

The material of the gastight housing is selected in view of the requirements imposed by the hot solids. For temperatures above 300° C in the housing it is recommended to provide a refractory lining of ceramic material.

The housing is suitably provided at appropriate locations with openings which can be closed and through which the interior of the housing is accessible for a check, for repairs or for cleaning.

Any gases which enter the housing together with the fine-grained gases must not exert a pressure on the sensing plate because this would introduce an error into the measurement. In such case it is desirable to provide a bypass conduit, which constitutes a gas flow path between the chambers above and below the sensing plates. Gases which require such precautionary measure may be evolved, e.g., during the treatment of the fine-grained coal or coke before the flow rate measurement.

DESCRIPTION OF THE DRAWING

An embodiment of the invention will be explained more fully and by way of example on the drawing, which is a longitudinal sectional view showing the apparatus for flow rate measurement.

A gastight housing 1 has an inlet 2 for hot fine-grained solids. The inlet leads to an intermediate chamber 3, which contains a screw conveyor 4, which is driven by its shaft 5 from a motor, not shown. Inspection openings which can be closed have been omitted on the drawing for the sake of clearness.

The fine-grained solids, which collect on the bottom of chamber 3 preferably as a thin layer, are continuously conveyed by the screw conveyor 4 to a passage 6, through which the solids fall freely into a downwardly adjoining downcomer well 7. The fine-grained solids from the chamber 3 fall from a constant height onto a sensing plate 8, which is disposed in the downcomer well 7, and impart impulses to the sensing plate. These impulses are delivered by a lever arm 9 to a sensing system 10, known per se. In a practical embodiment, the lever arm is preferably provided with protective insulation adjacent to the sensing chamber. The measuring system is capable of computing the solids flow rate from the impulses or impulse components imparted to the measuring plate 8 and of indicating the computed flow rate. The granular solids flow down from the sensing plate 8 and leave the downcomer well 7 at its lower end 7a.

It will be understood that conduits for the fine-grained solids are flanged to the inlet 2 and to the lower end 7a of the downcomer well and establish a connection to containers or the like so that the hot solids are shielded from the ambient air. If the fine-grained solids consist of coal or coake at temperatures between approximately 200° and 1000° C, a spontaneous ignition of the solids can be reliably prevented only by a gastight shielding.

A heating or other preliminary treatment of the granular solids often results in an evolution of gases, e.g., vaporous products of dry distillation, which cannot or should not be separated before the solids are subjected to the flow rate measurement. A gas stream impinging on the sensing plate 8 in addition to the solids would introduce an error into the measurement. To prevent this, a bypass conduit 11 for such gas is provided between the inlet 2 and the lower end 7a of the downcomer well so that the gas pressures in the intermediate chamber 3 and the downcomer well 7 are substantially equalized and there will be virtually no flow of gas in that region. The gas flows through the bypass conduit 11 because it presents the least resistance.

If the housing 1 is to be designed for relatively high temperatures it may be recommendable to provide the housing with a refractory ceramic lining. To ensure the rerequired mechanical stability of the sensing plate 8, the latter consists of an open-topped, shallow tub. This is not shown in detail on the drawing. A coolant, e.g., a purge gas, flows through the conduits 12 and 13 and through the measuring system 10 to prevent an excessive temperature rise thereof.

What we claim is:

1. Apparatus for measuring the flow rate of fine-grained solids, particularly coal or coke, which are at temperatures up to about 1000° C and impinge from a predetermined height on sensing plate means and impart impulses thereto which are fed to a measuring system, comprising gastight housing means provided with an inlet for the solids, intermediate chamber means adjacent said inlet containing substantially horizontally acting conveyor means for conveying the solids to a passage, downcomer well means disposed below the passage and containing said sensing plate and a bypass conduit for gases connecting the inlet of the housing means and the outlet region of the downcomer well.

2. Apparatus of claim 1 wherein the conveyor means is a screw conveyor.

3. Apparatus of claim 1 wherein the conveyor means is a chain conveyor.

4. Apparatus of claim 1 wherein the housing means has a refractory lining.

5. Apparatus of claim 1 wherein the measuring system is provided with cooling means.

* * * * *